(12) United States Patent
Zhang

(10) Patent No.: US 10,844,812 B2
(45) Date of Patent: Nov. 24, 2020

(54) FUEL-SAVING DEVICE

(71) Applicant: Zixuan Zhang, San Marino, CA (US)

(72) Inventor: Zixuan Zhang, San Marino, CA (US)

(*) Notice: Subject to any disclaimer, the term of this patent is extended or adjusted under 35 U.S.C. 154(b) by 0 days.

(21) Appl. No.: 16/550,265

(22) Filed: Aug. 25, 2019

(65) Prior Publication Data

US 2019/0383241 A1 Dec. 19, 2019

(51) Int. Cl.
| | | |
|---|---|---|
| *F02B 43/08* | (2006.01) |
| *F02M 25/12* | (2006.01) |
| *F02M 27/02* | (2006.01) |
| *F02M 35/024* | (2006.01) |
| *F02M 35/10* | (2006.01) |
| *F02B 47/06* | (2006.01) |
| *C01B 15/027* | (2006.01) |
| *C01B 13/02* | (2006.01) |
| *B01D 46/52* | (2006.01) |
| *C25B 1/30* | (2006.01) |
| *C25B 11/12* | (2006.01) |
| *C25B 11/04* | (2006.01) |
| *F02D 21/02* | (2006.01) |

(52) U.S. Cl.
CPC ........... *F02M 25/12* (2013.01); *B01D 46/521* (2013.01); *C01B 13/0214* (2013.01); *C01B 15/027* (2013.01); *C25B 1/30* (2013.01); *C25B 11/0405* (2013.01); *C25B 11/0415* (2013.01); *C25B 11/0452* (2013.01); *C25B 11/12* (2013.01); *F02B 47/06* (2013.01); *F02D 21/02* (2013.01); *F02M 27/02* (2013.01); *F02M 35/02416* (2013.01); *F02M 35/10144* (2013.01); *F02M 35/10249* (2013.01); *F02M 35/10255* (2013.01); *F02M 35/10386* (2013.01); *B01D 2279/60* (2013.01)

(58) Field of Classification Search
CPC ..... F02M 25/12; Y02T 10/121; Y02E 60/366; C25B 1/04
USPC ........................................................... 123/3
See application file for complete search history.

(56) References Cited

U.S. PATENT DOCUMENTS

| | | | | |
|---|---|---|---|---|
| 5,908,023 A | * | 6/1999 | Stutzenberger | B01D 53/22 123/585 |
| 6,257,175 B1 | * | 7/2001 | Mosher | F02B 43/10 123/3 |
| 8,176,884 B2 | * | 5/2012 | Tewari | F02B 47/06 123/3 |
| 8,485,163 B2 | * | 7/2013 | Clack | F02M 27/02 123/539 |
| 2004/0098989 A1 | * | 5/2004 | Mansour | B05B 7/0458 60/775 |
| 2005/0028868 A1 | * | 2/2005 | Basset | B01D 53/053 137/487.5 |

(Continued)

*Primary Examiner* — Long T Tran
*Assistant Examiner* — James J Kim
(74) *Attorney, Agent, or Firm* — Raymond Y. Chan; David and Raymond Patent Firm

(57) ABSTRACT

A fuel-saving device includes an oxygen generator adapted for producing oxygen, an air intake component adapted for inhaling air, and a conveyor comprising an output terminal adapted for outputting gas, an oxygen terminal connected with the oxygen generator, an air terminal connected with the air intake component, and a connector connecting the output terminal, the oxygen terminal and the air terminal, so as to allow oxygen from the oxygen generator and air from the air intake component to be mixed and output through the output terminal.

16 Claims, 4 Drawing Sheets

(56) References Cited

U.S. PATENT DOCUMENTS

| | | | |
|---|---|---|---|
| 2009/0148379 A1* | 6/2009 | Love | G01N 33/007 423/584 |
| 2011/0209993 A1* | 9/2011 | Barmichael | C25B 9/06 204/269 |
| 2012/0318245 A1* | 12/2012 | Clack | F02M 27/02 123/537 |
| 2014/0174915 A1* | 6/2014 | Trott | C25B 1/02 204/230.6 |
| 2015/0059304 A1* | 3/2015 | Kaufmann | B01D 46/0021 55/502 |
| 2019/0211782 A1* | 7/2019 | Van Tran | F02M 35/0218 |

* cited by examiner

FUEL-SAVING DEVICE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to engine technology, and more particularly to a fuel-saving device, which is able to provide a mix gas of air and oxygen to an engine for enhancing the fuel efficiency of the engine.

Description of Related Arts

The engine is the core component of a vehicle or vessel that determines the power, economy, stability, and environmental friendliness of the conveyance. Depending on the source of power, common vehicle engines can mainly be classified into diesel engines, gasoline engines, electric motors, and hybrid engines. Generally, gasoline engine and diesel engine are reciprocating piston internal combustion engine, which converts the chemical energy of fuel into mechanical energy of piston movement and output the power. The gasoline engine has advantages including but not limited to high speed, light weight, low noise, easy starting, and low manufacturing cost, while the diesel engine has a large compression ratio, high thermal efficiency as well as better economic performance and emission performance than the gasoline engine.

However, there are some shortcomings in the use of these conventional combustion engines. As a conventional combustion engine is in operation, the air is generally taken in to mix with the fuel, so that the mixture of the fuel and air can be burned in the combustion engine to generate power. Nevertheless, the oxygen content in the air is relatively low and the filtration efficiency of the air filter is limited, resulting in a relatively small of air intake and incomplete combustion of the fuel, thus leading to waste of fuel and producing serious exhaust pollution.

SUMMARY OF THE PRESENT INVENTION

An object of the present invention is to provide a fuel-saving device, which includes an oxygen generator to increase the oxygen content of the intake air to be mixed with fuel for a combustion engine, so as to enhance the fuel efficiency and the power of the combustion engine.

Another object of the present invention is to provide a fuel-saving device, which can avoid incomplete combustion of the fuel of a combustion engine, so as to reduce the exhaust pollution of the engine.

Another object of the present invention is to provide a fuel-saving device, which further includes an air intake component and a conveyer connecting with the oxygen generator and the air intake component and having an output terminal, such that the oxygen and the air can be mixed in the conveyer in a certain manner depending on the need and then output to be mixed with fuel for a combustion engine.

Another object of the present invention is to provide a fuel-saving device, wherein the conveyer has an output terminal, an oxygen terminal and an air terminal, wherein the fuel-saving device further includes a controller selectively electrically connected with the oxygen terminal, the air terminal, and/or the output terminal, so as to control the volume(s) and/or ratio(s) of the oxygen and air, and/or the output gas of the fuel-saving device.

Another object of the present invention is to provide a fuel-saving device, wherein the controller can also be electrically connected with the oxygen generator, so as to control the oxygen production, which also determines the volume and/or ratio of the oxygen in the output gas of the fuel-saving device, such that the oxygen aid can be more efficient, effective and economic.

Another object of the present invention is to provide a fuel-saving device, wherein the output terminal, the oxygen terminal and the air terminal respectively have an output regulator, an oxygen and an air regulator, which are sensors and valves of the terminals to allow the controller to detect the qualities of the gas in the output terminal, the oxygen terminal and the air terminal and determine the flows of each of them based on the detected data, given parameters, and/or external information received by the controller in a real-time manner.

Another object of the present invention is to provide a fuel-saving device, wherein the controller can further be connected to or integrated with an engine control unit (ECU), so as to allow the ECU to optimize the entire combustion process by controlling one or more parameters of the combustion process and to allow the engine to perform more powerfully and/or efficiently.

In order to achieve the above and other objects, the present invention provides a fuel-saving device, which comprises:

an oxygen generator, configured for producing oxygen;
an air intake component, configured for inhaling air; and
a conveyor, including an output terminal adapted for outputting gas, an oxygen terminal connected with the oxygen generator, an air terminal connected with the air intake component, and a connector connecting the output terminal, the oxygen terminal and the air terminal, so as to allow oxygen from the oxygen generator and air from the air intake component to be mixed and output through the output terminal.

According to a preferred embodiment, the output terminal includes an output pipeline and an output regulator arranged along the output pipeline in order to regulate the gas output from the output terminal.

According to a preferred embodiment, the oxygen terminal includes an oxygen pipeline and an oxygen regulator arranged along the oxygen pipeline in order to regulate the oxygen input from the oxygen terminal to the connector, wherein the air terminal comprises an air pipeline and an air regulator arranged along the air pipeline in order to regulate the air input from the air terminal to the connector.

According to a preferred embodiment, the fuel-saving device further includes a controller electrically connected with the conveyor, so as to control the gas output therefrom.

According to a preferred embodiment, the fuel-saving device further includes a controller electrically connected with the oxygen regulator and the air regulator respectively, so as to control the oxygen input from the oxygen terminal to the connector and the air input from the air terminal to the connector.

According to a preferred embodiment, the fuel-saving device further includes a controller electrically connected with the oxygen regulator, the air regulator and the output regulator, so as to control the oxygen input from the oxygen terminal to the connector, the air input from the air terminal to the connector, and the gas output from the connector.

According to a preferred embodiment, the fuel-saving device further includes a controller electrically connected with the oxygen generator, so as to control the oxygen production thereof, which can manage the oxygen supply in various modes from the maximum performance to the most economic production.

According to a preferred embodiment, the fuel-saving device further includes a controller electrically connected with the oxygen generator and the conveyor, so as to control the oxygen production of the oxygen generator and the gas output from the conveyor.

According to a preferred embodiment, the fuel-saving device further includes a controller electrically connected with the oxygen generator, the oxygen regulator and the air regulator, so as to control the oxygen production of the oxygen generator, the oxygen input from the oxygen terminal to the connector, and the air input from the air terminal to said connector.

According to a preferred embodiment, the fuel-saving device further includes a controller electrically connected with the oxygen generator, the oxygen regulator, the air regulator, and the output regulator, so as to control the oxygen production of the oxygen generator, the oxygen input from the oxygen terminal to the connector, the air input from the air terminal to the connector, and the gas output from the connector.

According to a preferred embodiment, the air intake component includes a filter, a shell, and a support arranged in the shell to support the filter, so as to filter the air inhaled to the air intake component for outputting the filtered air to the conveyor.

According to a preferred embodiment, the conveyor further includes a rack arranged thereon for mounting the conveyer.

According to a preferred embodiment, the oxygen generator further includes a mounting element arranged thereon for mounting the oxygen generator.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
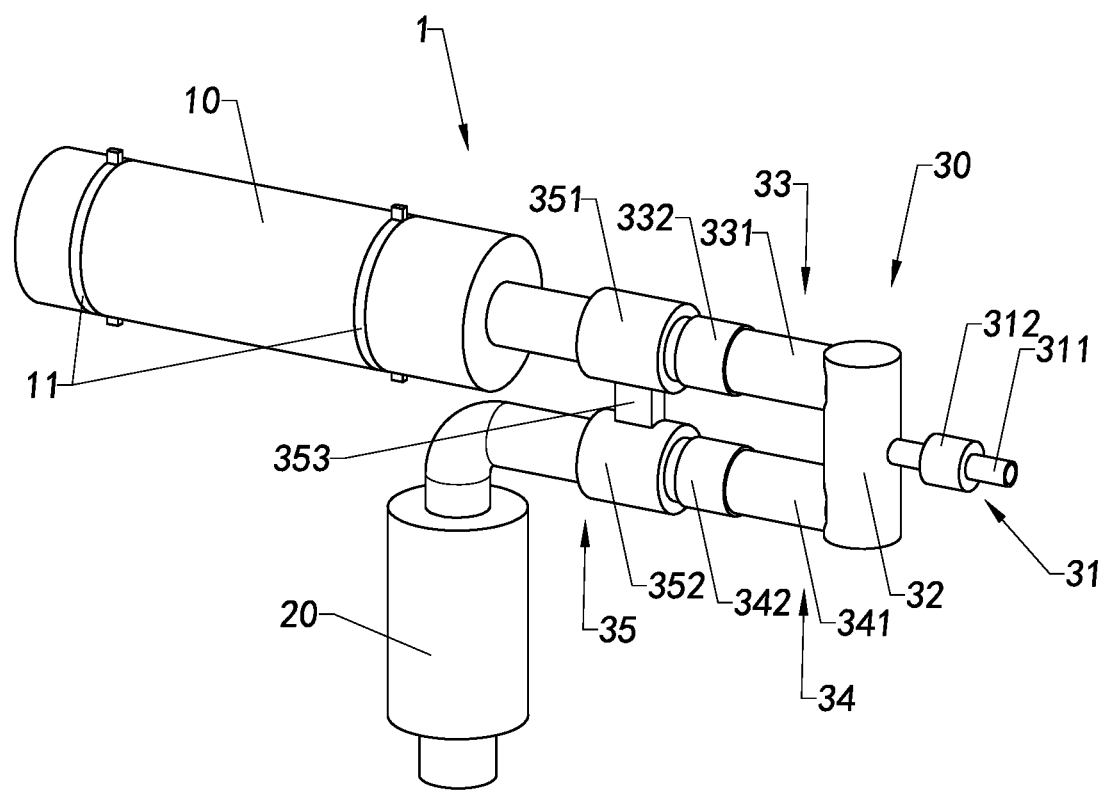
FIG. 1 is a perspective view of a fuel-saving device according to a preferred embodiment of the present invention.

Please referring to FIG. 1, a fuel-saving device 1 according to a preferred embodiment of the present invention includes an oxygen generator 10 configured for producing oxygen, an air intake component 20 configured for inhaling air, and a conveyor 30. The conveyor 30 includes an output terminal 31 arranged for outputting gas, an oxygen terminal 33 connected with the oxygen generator 10, an air terminal 34 connected with the air intake component 20, and a connector 32 connecting the output terminal 31, the oxygen terminal 33 and the air terminal 34, so as to allow oxygen produced by and released from the oxygen generator 10 and air inhaled by and released from the air intake component 20 to be mixed in the connector 32 of the conveyor 30 and output through the output terminal 31 of the conveyor 30 for supplying to the combustion engine 50.

Preferably, the fuel-saving device 1 is adapted for being connected to a combustion engine 50 for providing the combustion engine 50 a mixed gas that contains more or sufficient oxygen in order to avoid incomplete combustion of the fuel in the combustion engine 50 and, therefore, to enhance the fuel efficiency, engine power and combustion effectiveness and to reduce the exhaust pollution of the engine. As a result, the users may save more on fuel costs and pollute less to the environment.

Specifically, the output terminal 31 includes an output pipeline 311 and an output regulator 312 arranged along the output pipeline 311, the oxygen terminal 33 includes an oxygen pipeline 331 and an oxygen regulator 332 arranged along the oxygen pipeline 331, and the air terminal 34 includes an air pipeline 341 and an air regulator 342 arranged along the air pipeline 341. The output pipeline 311, the oxygen pipeline 331 and the air pipeline 341 are the main structures and channels that respectively allow the mixed gas, the oxygen and the inhaled air to pass through, while the output regulator 312, the oxygen regulator 332 and the air regulator 342 are the regulators that respectively check and control the flow of each of the pipelines. According to some implementation, the regulators 312, 332, 342 can be embodied as solenoid valve, which can individually be controlled to close or open to a certain degree at a time, so as for the user to constantly and selectively decide the flow of each of the pipelines 311, 331, 341. According to another implementation, the regulators 312, 332, 342 can be embodied as solenoid with sensors that detect the flow and/or other qualities, such as compositions, concentration, and etc. of the gas at the regulators 312, 332, 342 before released.

It is worth mentioning that the oxygen generator 10 can be embodied in various oxygen generating apparatuses capable of producing oxygen. Preferably, referring to FIGS. 1, 3 and 4, it is embodied as a two-step oxygen generating machine, which includes a hydrogen peroxide ($H_2O_2$) generating unit 11 that generates hydrogen peroxide and an oxygen generating unit 12 that converts the hydrogen peroxide generated in the hydrogen peroxide generating unit 11 into water and oxygen through catalyst 121, preferably manganese peroxide (other catalyst such as manganese dioxide or potassium iodide may also do) coated on one or more meshes 122 contained in the oxygen generating unit 12. The hydrogen peroxide generating unit 11 may produce hydrogen peroxide from water and oxygen in the air by means of current electrolysis using only two electrodes 111, 112, such as a carbon felt cathode 111 and a RuO2 coated titanium anode 112 (or two electrodes 111 and a membrane 112). According to other embodiment, the oxygen generator 10 may also be embodied as a chemical oxygen generator, such that input air is not required. In such case, oxygen is generated by means of a chemical reaction which can be triggered in a certain way, such as ignition and etc. This type of chemical oxygen generators can also be configured to produce oxygen in various delivery rates and lifespan depending on the usage and the chemical stock. In other words, the chemicals can be stored separately in various manners and only part of the chemicals will be utilized to produce oxygen at a time. Person skilled in the art should be able to understand that the oxygen generator 10 may utilize one or more various means, materials, and/or chemical ingredients to generate oxygen. Therefore, the present invention shall not be limited hereby.

Figure 3:
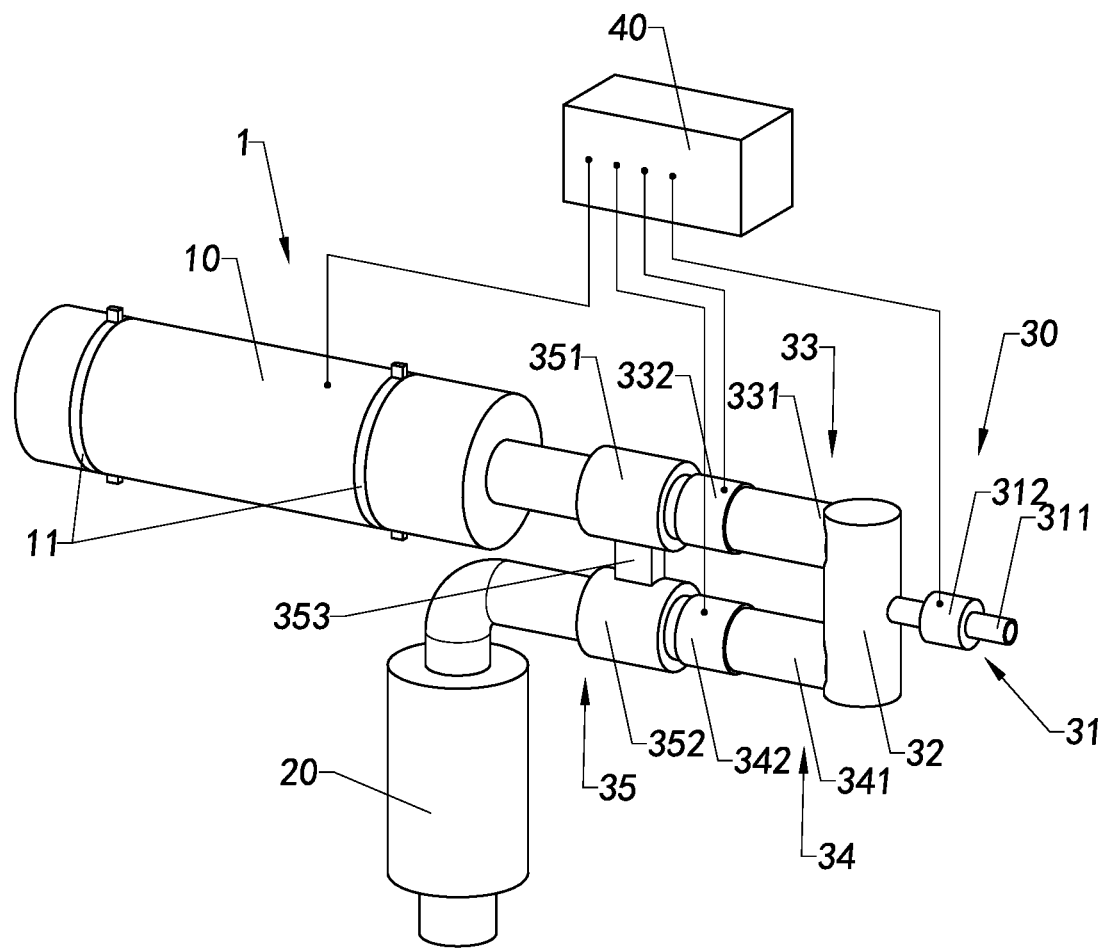
FIG. 3 is another perspective view of the fuel-saving device according to the above preferred embodiment of the present invention.
Figure 4:
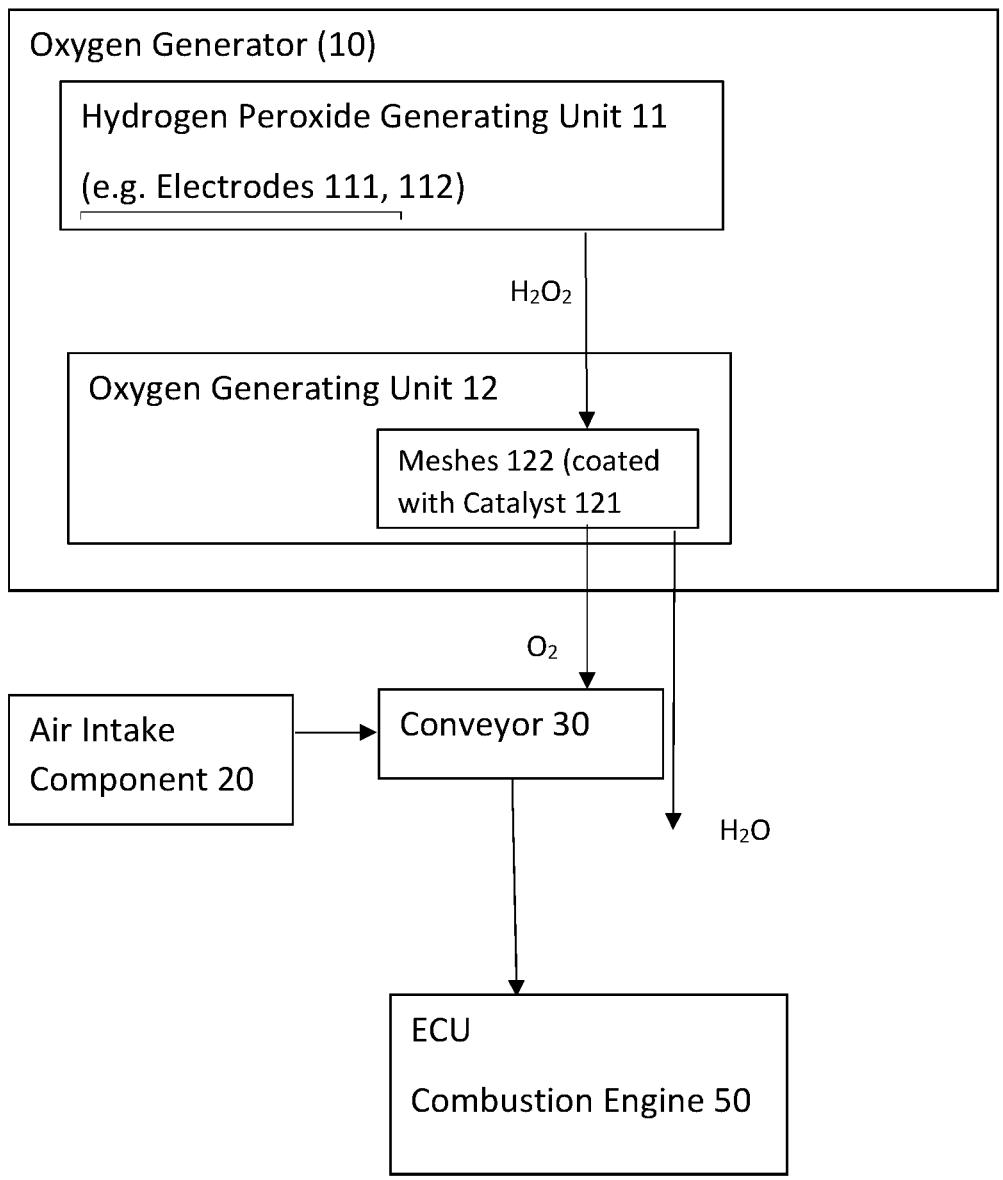
FIG. 4 is a schematic view of the fuel-saving device, illustrating one embodiment of the oxygen generating unit, according to the above preferred embodiment of the present invention.

Referring to FIG. 3, according to the present preferred embodiment, the fuel-saving device 1 further includes a controller 40 electrically connected with the output regulator 312, the oxygen regulator 332 and the air regulator 342, such that the user may either directly or indirectly utilize the controller 40 to detect the gas qualities of each of the pipelines 311, 331, 341 and, based on given parameters/procedures, to respectively control the gas flow (i.e. mixed gas, oxygen, air) of each of the pipelines 311, 331, 341, so as to achieve a preferred result of combustion thereby rendered by different supplying mode of the mixed gas (e.g. various volume(s) and/or ratio(s) of the oxygen and air, and/or the output gas of the fuel-saving device depending on the needs).

Furthermore, according to the preferred embodiment, the controller 40 can also be connected to or integrated with the engine control unit (ECU) of the combustion engine 50, so as to allow the ECU to control the above mentioned operations based on its parameters/procedures and other information it received (e.g. oxygen content in the engine, engine speed, qualities if the emission, driving mode, safety reason, and etc.).

Besides, the controller 40 can further be electrically connected with the oxygen generator 10 to control the oxygen production thereof according to a combustion condition of the combustion engine 50, which can manage the oxygen supply in various modes from the maximum performance to the most economic production. In some cases, if the engine speed is low, it may not require the oxygen generator 10 to produce oxygen in full speed. Therefore, the controller 40 may slow down or decrease the oxygen production of the oxygen generator 10 to avoid waste of excess oxygen and to extend the lifespan of the supplies of the oxygen generator 10. On the other hand, if the engine speed is high, the controller 40 may speed up or increase the oxygen production of the oxygen generator 10, so as to ensure the oxygen supply to the combustion engine 50 for complete combustions thereof that helps on the fuel efficiency, emission, and performance of the combustion engine 50.

Figure 2:
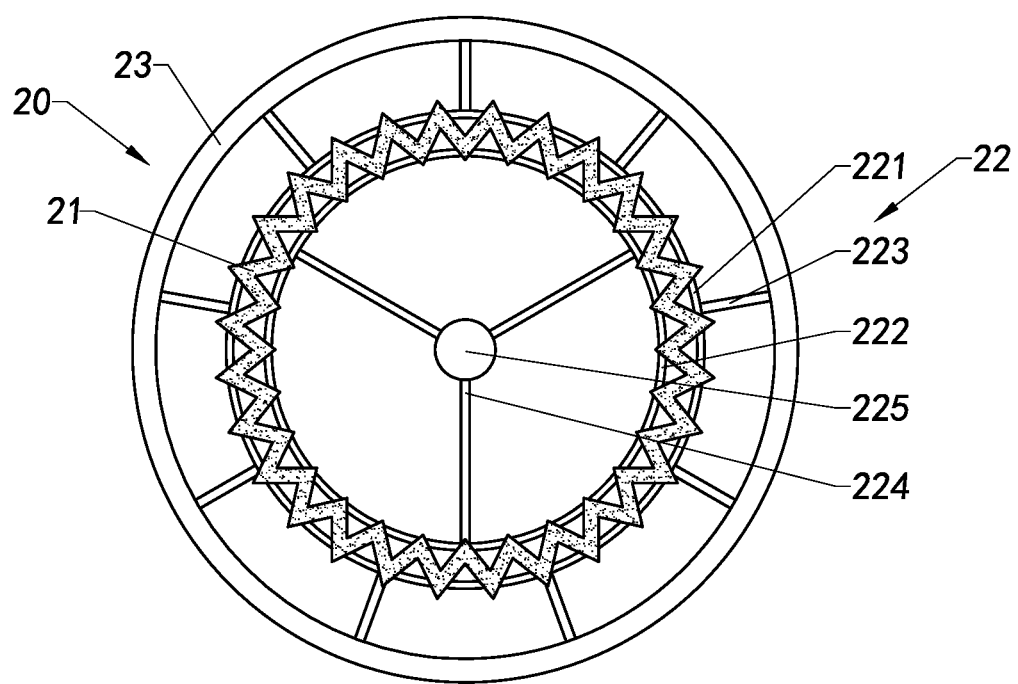
FIG. 2 is a sectional view of an air intake component of the fuel-saving device according to the above preferred embodiment of the present invention

In addition, referring to FIG. 2, the air intake component 20 includes a filter 21 for filtering the inhaled air, a support 22 for supporting the filter 21 in position, and a shell 23 to form the main structure of the air intake component 20 and to serve as a channel for the air flow. The support 22 is affixed in the shell 23 to hold the filter 21 in position in the manner that the air enter the channel defined by the shell 23 will have to pass through and be filtered by the filter 21 to reach the other end of the channel, as illustrated in FIG. 2, such that the air intake component 20 can provide filtered air to the conveyor 30 of the fuel-saving device 1. According to the present preferred embodiment, the support 22 includes a first frame 221, a second frame 222, a first strut 223, a second strut 224, and a brace 225. The first frame 221 and the second frame 222 respectively brace the filter 21 from the outer side and the inner side thereof. The first frame 221 in the outer side is affixed on the inner wall of the shell 23 by the first strut 223, while the second frame 222 in the inner side is affixed on the brace 225 by the second strut 224. The brace 225 is affixed in the shell 23 so as to further stabilize the attachment of the second strut 224. The first frame 221, the second frame 222 and the filter 21 divide the space in the shell 23 into an inner chamber and an outer chamber communicating to the input end and the output end of the air intake component 20, such that the air entered the air intake component 20 has to pass through the filter 21 to be output to the air terminal 34 of the conveyor 30 through the output end.

Person skilled in the art should be able to understand that the direction of the arrangement of the air intake component 20 is changeable. In other words, the first frame 221, the second frame 222 and the filter 21 may also divide the space of the shell 23 in many other ways and directions. Therefore, the present invention shall not be limited hereby. Besides, it is worth mentioning that the mode of air intake of the air intake component 20 is not limited. In other words, the air may enter the air intake component 20 through natural aspiration, supercharging, or other means based on the actual needs.

Next, according to the above preferred embodiment of the present invention, the oxygen generator 10 includes a mounting element 11 arranged thereon, so as for mounting the oxygen generator at a designated position. The conveyor 30 further comprises a rack 35 arranged thereon, so as for mounting the conveyor 30, which helps to anchor or install the fuel-saving device 1 at designated position and reinforce the structure of the conveyor 30. The rack 35 includes a first holder 351 sleeved on the oxygen pipeline 331, a second holder 352 sleeved on the air pipeline 341, a bond 353 connecting the first holder 351 and the second holder 352 for stabilize the attachment thereof.

Contrasting to the art, the fuel-saving device 1 not only provides oxygen aid to the combustion engine 50 to enhance its fuel efficiency and performance, but also allows customized and optimized result of the combustion engine 50 to be achieved through enabling a smart management of the mixed gas of oxygen and air supply to the combustion engine 50 through the control of the controller 40.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A fuel-saving device for a combustion engine, comprising:

an oxygen generator, configured for producing oxygen, comprising a hydrogen peroxide generating unit configured for generating hydrogen peroxide from water and oxygen in air and an oxygen generating unit configured for converting the hydrogen peroxide generated in said hydrogen peroxide generating unit into water and oxygen through a catalyst coated on one or more meshes contained in said oxygen generating unit;

an air intake component, configured for inhaling air, including a filter for filtering an inhaled air;

a conveyor, comprising an output terminal, arranged for outputting gas, including an output pipeline and an output regulator arranged along said output pipeline, an oxygen terminal, connected with said oxygen generator, including an oxygen pipeline and an oxygen regulator arranged along said oxygen pipeline, an air terminal, connected with said air intake component, including an air pipeline and air regulator arranged along said air pipeline, and a connector connecting said output terminal, said oxygen terminal and said air terminal, adapted for allowing oxygen from said oxygen generator and air from said air intake component to be mixed to form a mixed gas and output through said output terminal for supplying to the combustion engine, wherein the mixed gas, the oxygen and the inhaled air passing through said output pipeline, said oxygen pipeline and said air pipeline respectively, while said output regulator, said oxygen regulator and said air regulator checking and controlling flows of the mixed gas, the oxygen and the inhaled air in said output pipeline, said oxygen pipeline and said air pipeline respectively; and a controller which is electrically connected with said output regulator, said oxygen regulator and said air regulator, and configured for respectively detecting qualities of the mixed gas in said output pipeline, the oxygen in said oxygen pipeline and the air in said air pipeline to respectively control a mixed gas flow of said output pipeline, an oxygen flow of said oxygen pipeline and an air flow of said air pipeline for ensuring the mixed gas containing sufficient oxygen to avoid incomplete combustion of fuel in the combustion engine to enhance fuel efficiency, engine power and combustion effectiveness, wherein said controller controls a predetermined amount of the oxygen produced from said oxygen generator according to a combustion condition of the combustion engine.

2. The fuel-saving device, as recited in claim 1, wherein said catalyst is selected from the group consisting of manganese peroxide, manganese dioxide and potassium iodide coated on one or more meshes.

3. The fuel-saving device, as recited in claim 1, wherein said hydrogen peroxide generating unit comprises a cathode and an anode therein configured for producing the hydrogen peroxide from water and oxygen in the air by means of electrolysis.

4. The fuel-saving device, as recited in claim 2, wherein said hydrogen peroxide generating unit comprises a carbon felt cathode and a RuO2 coated titanium anode therein configured for producing the hydrogen peroxide from water and oxygen in the air by means of electrolysis.

5. The fuel-saving device, as recited in claim 1, wherein said air intake component further includes a support arranged to support said filter in position and a shell to form a main structure of said air intake component and to serve as a channel for air flow, wherein said support is affixed in said shell to hold said filter in position such that the air entering said channel defined by said shell has to pass through and be filtered by said filter to provide a filter air to said conveyor.

6. The fuel-saving device, as recited in claim 5, wherein said support of said air intake component includes a first frame, a second frame, a first strut, a second strut, and a brace, wherein said first frame and said second frame respectively brace said filter from an outer side and an inner side thereof, wherein said first frame in said outer side is affixed on an inner wall of said shell by said first strut while said second frame in said inner side is affixed on said brace by said second strut, wherein said brace is affixed in said shell to stabilize an attachment of said second strut, wherein said first frame, said second frame and said filter divide a space in said shell into an inner chamber and an outer chamber communicating to an input end and an output end of said air intake component, such that the air entering said air intake component through said input end has to pass through said filter to be output to said air terminal of said conveyor through said output end of said air intake component.

7. The fuel-saving device, as recited in claim 2, wherein said air intake component further includes a support arranged to support said filter in position and a shell to form a main structure of said air intake component and to serve as a channel for air flow, wherein said support is affixed in said shell to hold said filter in position such that the air entering said channel defined by said shell has to pass through and be filtered by said filter to provide a filter air to said conveyor.

8. The fuel-saving device, as recited in claim 7, wherein said support of said air intake component includes a first frame, a second frame, a first strut, a second strut, and a brace, wherein said first frame and said second frame respectively brace said filter from an outer side and an inner side thereof, wherein said first frame in said outer side is affixed on an inner wall of said shell by said first strut while said second frame in said inner side is affixed on said brace by said second strut, wherein said brace is affixed in said shell to stabilize an attachment of said second strut, wherein said first frame, said second frame and said filter divide a space in said shell into an inner chamber and an outer chamber communicating to an input end and an output end of said air intake component, such that the air entering said air intake component through said input end has to pass through said filter to be output to said air terminal of said conveyor through said output end of said air intake component.

9. The fuel-saving device, as recited in claim 3, wherein said air intake component further includes a support arranged to support said filter in position and a shell to form a main structure of said air intake component and to serve as a channel for air flow, wherein said support is affixed in said shell to hold said filter in position such that the air entering said channel defined by said shell has to pass through and be filtered by said filter to provide a filter air to said conveyor.

10. The fuel-saving device, as recited in claim 9, wherein said support of said air intake component includes a first frame, a second frame, a first strut, a second strut, and a brace, wherein said first frame and said second frame respectively brace said filter from an outer side and an inner side thereof, wherein said first frame in said outer side is affixed on an inner wall of said shell by said first strut while said second frame in said inner side is affixed on said brace by said second strut, wherein said brace is affixed in said shell to stabilize an attachment of said second strut, wherein said first frame, said second frame and said filter divide a space in said shell into an inner chamber and an outer chamber communicating to an input end and an output end of said air intake component, such that the air entering said air intake component through said input end has to pass through said filter to be output to said air terminal of said conveyor through said output end of said air intake component.

11. The fuel-saving device, as recited in claim 4, wherein said air intake component further includes a support arranged to support said filter in position and a shell to form a main structure of said air intake component and to serve as a channel for air flow, wherein said support is affixed in said shell to hold said filter in position such that the air entering said channel defined by said shell has to pass through and be filtered by said filter to provide a filter air to said conveyor.

12. The fuel-saving device, as recited in claim 11, wherein said support of said air intake component includes a first frame, a second frame, a first strut, a second strut, and a brace, wherein said first frame and said second frame respectively brace said filter from an outer side and an inner side thereof, wherein said first frame in said outer side is affixed on an inner wall of said shell by said first strut while said second frame in said inner side is affixed on said brace by said second strut, wherein said brace is affixed in said shell to stabilize an attachment of said second strut, wherein said first frame, said second frame and said filter divide a space in said shell into an inner chamber and an outer chamber communicating to an input end and an output end of said air intake component, such that the air entering said air intake component through said input end has to pass through said filter to be output to said air terminal of said conveyor through said output end of said air intake component.

13. The fuel-saving device, as recited in claim 3, wherein said output regulator, said oxygen regulator and said air regulator are solenoid valves.

14. The fuel-saving device, as recited in claim 12, wherein said output regulator, said oxygen regulator and said air regulator are solenoid valves.

15. A fuel-saving device for a combustion engine, comprising:
   an oxygen generator configured for producing oxygen;
   an air intake component, configured for inhaling air, including a filter for filtering an inhaled air;
   a conveyor, comprising
   an output terminal, arranged for outputting gas, including an output pipeline and an output regulator arranged along said output pipeline,
   an oxygen terminal, connected with said oxygen generator, including an oxygen pipeline and an oxygen regulator arranged along said oxygen pipeline,
   an air terminal, connected with said air intake component, including an air pipeline and air regulator arranged along said air pipeline, and
   a connector connecting said output terminal, said oxygen terminal and said air terminal, adapted for allowing oxygen from said oxygen generator and air from said air intake component to be mixed to form a mixed gas and output through said output terminal for supplying to the combustion engine, wherein the mixed gas, the oxygen and the inhaled air passing through said output pipeline, said oxygen pipeline and said air pipeline respectively, while said output regulator, said oxygen regulator and said air regulator checking and controlling flows of the mixed gas, the oxygen and the inhaled air in said output pipeline, said oxygen pipeline and said air pipeline respectively; and
   a controller which is electrically connected with said output regulator, said oxygen regulator and said air regulator, and configured for respectively detecting qualities of the mixed gas in said output pipeline, the oxygen in said oxygen pipeline and the air in said air pipeline to respectively control a mixed gas flow of said output pipeline, an oxygen flow of said oxygen pipeline and an air flow of said air pipeline for ensuring the mixed gas containing sufficient oxygen to avoid incomplete combustion of fuel in the combustion engine to enhance fuel efficiency, engine power and combustion effectiveness, wherein said controller controls a predetermined amount of the oxygen produced from said oxygen generator according to a combustion condition of the combustion engine,
   wherein said air intake component further includes a support arranged to support said filter in position and a shell to form a main structure of said air intake component and to serve as a channel for air flow, wherein said support is affixed in said shell to hold said filter in position such that the air entering said channel defined by said shell has to pass through and be filtered by said filter to provide a filter air to said conveyor, wherein said support of said air intake component includes a first frame, a second frame, a first strut, a second strut, and a brace, wherein said first frame and said second frame respectively brace said filter from an outer side and an inner side thereof, wherein said first frame in said outer side is affixed on an inner wall of said shell by said first strut while said second frame in said inner side is affixed on said brace by said second strut, wherein said brace is affixed in said shell to stabilize an attachment of said second strut, wherein said first frame, said second frame and said filter divide a space in said shell into an inner chamber and an outer chamber communicating to an input end and an output end of said air intake component, such that the air entering said air intake component through said input end has to pass through said filter to be output to said air terminal of said conveyor through said output end of said air intake component.

16. The fuel-saving device, as recited in claim 15, wherein said output regulator, said oxygen regulator and said air regulator are solenoid valves.

* * * * *